US008750556B2

(12) United States Patent
McKinley et al.

(10) Patent No.: US 8,750,556 B2
(45) Date of Patent: *Jun. 10, 2014

(54) WATERMARK SYSTEMS AND METHODS

(75) Inventors: Tyler J. McKinley, Lake Oswego, OR (US); Phillip Andrew Seder, Portland, OR (US); Tony F. Rodriguez, Portland, OR (US)

(73) Assignee: Digimarc Corporation, Beaverton, OR (US)

( * ) Notice: Subject to any disclaimer, the term of this patent is extended or adjusted under 35 U.S.C. 154(b) by 1693 days.

This patent is subject to a terminal disclaimer.

(21) Appl. No.: 11/548,167

(22) Filed: Oct. 10, 2006

(65) Prior Publication Data

US 2007/0183623 A1    Aug. 9, 2007

Related U.S. Application Data

(63) Continuation of application No. 10/029,229, filed on Dec. 21, 2001, now Pat. No. 7,123,740.

(60) Provisional application No. 60/257,822, filed on Dec. 21, 2000.

(51) Int. Cl.
*G06K 9/00*    (2006.01)

(52) U.S. Cl.
USPC .......................................................... 382/100

(58) Field of Classification Search
USPC .................. 382/100, 183; 235/375, 380, 382, 235/382.5, 494
See application file for complete search history.

(56) References Cited

U.S. PATENT DOCUMENTS

| | | |
|---|---|---|
| 4,403,869 A | 9/1983 | Crutcher |
| 4,511,259 A | 4/1985 | Horiuchi |
| 4,590,366 A | 5/1986 | Rothfjell |
| 4,677,466 A | 6/1987 | Lert, Jr. et al. |
| 4,807,031 A | 2/1989 | Broughton et al. |
| 4,843,562 A | 6/1989 | Kenyon |
| 4,857,716 A * | 8/1989 | Gombrich et al. ............ 235/375 |
| 5,010,405 A | 4/1991 | Schreiber et al. |
| 5,135,095 A | 8/1992 | Kocznar et al. |
| 5,276,311 A * | 1/1994 | Hennige ........................ 235/380 |
| 5,319,735 A | 6/1994 | Preuss et al. |
| 5,444,230 A | 8/1995 | Baldwin |
| 5,450,491 A * | 9/1995 | McNair ......................... 713/184 |
| 5,478,997 A * | 12/1995 | Bridgelall et al. ....... 235/462.25 |
| 5,481,377 A | 1/1996 | Udagawa et al. |
| 5,502,576 A | 3/1996 | Ramsay et al. |
| 5,617,119 A | 4/1997 | Briggs et al. |
| 5,629,980 A | 5/1997 | Stefik |
| 5,640,193 A | 6/1997 | Wellner |
| 5,661,632 A | 8/1997 | Register |
| 5,663,766 A | 9/1997 | Sizer, II |
| 5,671,267 A | 9/1997 | August et al. |
| 5,671,277 A | 9/1997 | Ikenoue et al. |
| 5,692,073 A | 11/1997 | Cass |
| 5,699,427 A | 12/1997 | Chow et al. |
| 5,717,940 A | 2/1998 | Peairs et al. |
| 5,761,686 A | 6/1998 | Bloomberg |
| 5,764,770 A | 6/1998 | Schipper |
| 5,765,152 A | 6/1998 | Erickson |
| 5,765,176 A | 6/1998 | Bloomberg |
| 5,772,250 A | 6/1998 | Gasper |
| 5,778,192 A | 7/1998 | Schuster et al. |
| 5,805,152 A * | 9/1998 | Furusawa ...................... 715/205 |
| 5,809,317 A | 9/1998 | Kogan et al. |
| 5,822,436 A * | 10/1998 | Rhoads ........................... 380/54 |
| 5,841,978 A | 11/1998 | Rhoads |
| 5,860,074 A | 1/1999 | Rowe et al. |
| 5,889,868 A | 3/1999 | Moskowitz et al. |
| 5,893,908 A | 4/1999 | Cullen et al. |
| 5,901,224 A | 5/1999 | Hecht |
| 5,903,729 A | 5/1999 | Reber et al. |
| 5,907,350 A | 5/1999 | Nemirofsky |
| 5,918,223 A | 6/1999 | Blum et al. |
| 5,919,730 A | 7/1999 | Gasper et al. |
| 5,930,767 A * | 7/1999 | Reber et al. ..................... 705/26 |
| 5,933,498 A | 8/1999 | Schneck et al. |
| 5,933,829 A | 8/1999 | Durst |
| 5,938,726 A * | 8/1999 | Reber et al. ................... 709/217 |
| 5,939,699 A | 8/1999 | Perttunen et al. |

(Continued)

FOREIGN PATENT DOCUMENTS

| | | | |
|---|---|---|---|
| WO | WO 0003328 A1 * | 1/2000 | |
| WO | WO00/70585 | 11/2000 | |

OTHER PUBLICATIONS

Bloomberg, "Embedding Digital Data on Paper in Iconic Text" SPIE vol. 3027, Document Recognition IV, pp. 67-80 (1997).

Johnson, et al., "Bridging the Paper and Electronic Worlds: The Paper User Interface", Interchi '93, pp. 507-512, Apr. 1993.

Newman, William, et al. "A Desk Supporting Computer-Based Interaction with paper Documents," ACM Conference on Human Factors in Computing Systems (CHI '92) May 3-7, 1992, pp. 587-592.

Peairs, "Iconic Paper," Proceedings of the Third International Conference on Document Analysis and Recognition (ICDAR '95), pp. 1174-1179, 1995.

Rao, et al. "Protofoil: Storing and Finding the Information Worker's Paper Documents in an Electronic File Cabinet," Human Factors in Computing Systems (CHI '94), pp. 180-186, Boston, MA, Apr. 1994.

(Continued)

*Primary Examiner* — Vikkram Bali

(57) ABSTRACT

A number of novel watermarking applications, and improvements to watermarking methods, are disclosed. Included are techniques for encoding printed circuit boards and street signs with watermarks, deterring credit card fraud and controlling software licensing using watermarks, registering collectibles via watermarks, encoding the margins of printed pages with watermarks, and using watermarks to convey extra information in video by which fidelity of the rendered video may be improved. One particular arrangement is a method in which a PDA, wristwatch, or other portable device with a display screen presents a pattern that includes a machine-readable identifier. This image is sensed by a separate device, such as a webcam or a camera-equipped cell phone. The sensing device can then take an action based on the identifier. In some arrangements, the action is personalized to the user.

23 Claims, No Drawings

(56) References Cited

U.S. PATENT DOCUMENTS

| | | | |
|---|---|---|---|
| 5,940,595 A * | 8/1999 | Reber et al. | 709/227 |
| 5,943,422 A | 8/1999 | Van Wie | |
| 5,951,055 A | 9/1999 | Mowry, Jr. | |
| 5,953,047 A | 9/1999 | Nemirofsky | |
| 5,956,716 A | 9/1999 | Kenner et al. | |
| 5,960,085 A | 9/1999 | de la Huerga | |
| 5,971,277 A * | 10/1999 | Cragun et al. | 235/462.01 |
| 5,973,731 A | 10/1999 | Schwab | |
| 5,978,477 A | 11/1999 | Hull et al. | |
| 5,978,773 A | 11/1999 | Hudetz et al. | |
| 5,986,651 A * | 11/1999 | Reber et al. | 715/738 |
| 5,995,105 A * | 11/1999 | Reber et al. | 715/835 |
| 5,995,978 A | 11/1999 | Cullen et al. | |
| 6,002,946 A * | 12/1999 | Reber et al. | 455/557 |
| 6,006,226 A | 12/1999 | Cullen et al. | |
| 6,012,102 A * | 1/2000 | Shachar | 710/5 |
| 6,028,960 A | 2/2000 | Graf et al. | |
| 6,036,086 A * | 3/2000 | Sizer et al. | 235/375 |
| 6,038,333 A | 3/2000 | Wang | |
| 6,041,374 A * | 3/2000 | Postman et al. | 710/73 |
| 6,081,629 A | 6/2000 | Browning | |
| 6,082,620 A | 7/2000 | Bone, Jr. | |
| 6,085,205 A | 7/2000 | Peairs et al. | |
| 6,115,741 A | 9/2000 | Domenikos et al. | |
| 6,119,944 A | 9/2000 | Mulla | |
| 6,122,403 A | 9/2000 | Rhoads | |
| 6,134,548 A * | 10/2000 | Gottsman et al. | 1/1 |
| 6,142,368 A * | 11/2000 | Mullins et al. | 235/375 |
| 6,182,090 B1 | 1/2001 | Peairs | |
| 6,182,169 B1 * | 1/2001 | Force et al. | 710/62 |
| 6,192,138 B1 | 2/2001 | Yamadaji | |
| 6,199,048 B1 * | 3/2001 | Hudetz et al. | 705/23 |
| 6,199,073 B1 | 3/2001 | Peairs et al. | |
| 6,199,099 B1 * | 3/2001 | Gershman et al. | 709/203 |
| 6,201,879 B1 | 3/2001 | Bender et al. | |
| 6,219,787 B1 | 4/2001 | Brewer | |
| 6,223,166 B1 | 4/2001 | Kay | |
| 6,233,684 B1 | 5/2001 | Stefik et al. | |
| 6,243,480 B1 | 6/2001 | Zhao et al. | |
| 6,247,050 B1 | 6/2001 | Tso et al. | |
| 6,249,870 B1 | 6/2001 | Kobayashi et al. | |
| 6,253,190 B1 | 6/2001 | Sutherland | |
| 6,256,110 B1 | 7/2001 | Yoshitani | |
| 6,256,398 B1 * | 7/2001 | Chang | 382/100 |
| 6,311,214 B1 * | 10/2001 | Rhoads | 709/217 |
| 6,314,457 B1 | 11/2001 | Schena et al. | |
| 6,315,195 B1 | 11/2001 | Ramachandran | |
| 6,320,675 B1 | 11/2001 | Sakaki et al. | |
| 6,325,420 B1 | 12/2001 | Zhang et al. | |
| 6,334,721 B1 | 1/2002 | Horigane | |
| 6,351,815 B1 | 2/2002 | Adams | |
| 6,359,837 B1 | 3/2002 | Tsukamoto | |
| 6,362,802 B1 | 3/2002 | Fujiwara et al. | |
| 6,366,771 B1 * | 4/2002 | Angle et al. | 455/414.1 |
| 6,369,904 B1 | 4/2002 | Bhattacharjya et al. | |
| 6,384,935 B1 | 5/2002 | Yamazaki | |
| 6,385,591 B1 | 5/2002 | Mankoff | |
| 6,389,055 B1 | 5/2002 | August | |
| 6,389,182 B1 * | 5/2002 | Ihara et al. | 382/309 |
| 6,408,082 B1 | 6/2002 | Rhoads | |
| 6,438,251 B1 | 8/2002 | Yamaguchi | |
| 6,439,465 B1 | 8/2002 | Bloomberg | |
| 6,512,919 B2 | 1/2003 | Ogasawara | |
| 6,522,770 B1 | 2/2003 | Seder et al. | |
| 6,535,618 B1 | 3/2003 | Rhoads | |
| 6,542,933 B1 * | 4/2003 | Durst et al. | 709/229 |
| 6,573,916 B1 | 6/2003 | Grossweiler | |
| 6,574,350 B1 | 6/2003 | Rhoads et al. | |
| 6,577,746 B1 | 6/2003 | Evans | |
| 6,591,001 B1 * | 7/2003 | Oda et al. | 382/117 |
| 6,614,914 B1 | 9/2003 | Rhoads | |
| 6,614,915 B2 | 9/2003 | Powell et al. | |
| 6,622,919 B1 * | 9/2003 | Wilz et al. | 235/472.01 |
| 6,636,615 B1 | 10/2003 | Rhoads et al. | |
| 6,643,386 B1 | 11/2003 | Foster | |
| 6,650,761 B1 | 11/2003 | Rodriguez et al. | |
| 6,681,028 B2 * | 1/2004 | Rodriguez et al. | 382/100 |
| 6,694,043 B2 | 2/2004 | Seder et al. | |
| 6,701,369 B1 * | 3/2004 | Philyaw | 709/229 |
| 6,701,522 B1 | 3/2004 | Rubin et al. | |
| 6,714,683 B1 | 3/2004 | Tian | |
| 6,736,322 B2 * | 5/2004 | Gobburu et al. | 235/462.46 |
| 6,749,120 B2 | 6/2004 | Hung et al. | |
| 6,788,800 B1 | 9/2004 | Carr et al. | |
| 6,792,292 B1 | 9/2004 | Chatani | |
| 6,813,039 B1 | 11/2004 | Silverbrook | |
| 6,836,799 B1 * | 12/2004 | Philyaw et al. | 709/224 |
| 6,871,780 B2 * | 3/2005 | Nygren et al. | 235/375 |
| 6,877,032 B1 * | 4/2005 | Philyaw | 709/217 |
| 6,898,299 B1 * | 5/2005 | Brooks | 382/115 |
| 6,947,571 B1 * | 9/2005 | Rhoads et al. | 382/100 |
| 6,965,682 B1 * | 11/2005 | Davis et al. | 382/100 |
| 6,965,683 B2 | 11/2005 | Hein, III | |
| 6,995,859 B1 | 2/2006 | Silverbrook | |
| 7,003,495 B1 | 2/2006 | Burger et al. | |
| 7,024,016 B2 | 4/2006 | Rhoads et al. | |
| 7,070,103 B2 | 7/2006 | Melick et al. | |
| 7,090,136 B2 | 8/2006 | Muramatsu | |
| 7,123,740 B2 * | 10/2006 | McKinley | 382/100 |
| 7,139,014 B1 * | 11/2006 | Kim et al. | 348/14.01 |
| 7,142,691 B2 | 11/2006 | Levy | |
| 7,164,780 B2 | 1/2007 | Brundag et al. | |
| 7,171,018 B2 * | 1/2007 | Rhoads et al. | 382/100 |
| 7,240,036 B1 * | 7/2007 | Mamdani et al. | 705/75 |
| 7,251,730 B2 | 7/2007 | Rose | |
| 7,257,545 B1 * | 8/2007 | Hung | 705/14.26 |
| 7,298,864 B2 | 11/2007 | Jones | |
| 7,314,407 B1 * | 1/2008 | Pearson | 463/7 |
| 7,330,564 B2 | 2/2008 | Brundage | |
| 7,369,676 B2 | 5/2008 | Hein, III | |
| 7,508,954 B2 | 3/2009 | Lev | |
| 7,552,193 B2 | 6/2009 | Carro | |
| 7,747,037 B2 | 6/2010 | Hein, III | |
| 7,756,892 B2 | 7/2010 | Levy | |
| 2001/0001854 A1 | 5/2001 | Schena et al. | |
| 2001/0006585 A1 | 7/2001 | Horigane | |
| 2001/0011233 A1 | 8/2001 | Narayanaswami | |
| 2001/0016852 A1 | 8/2001 | Peairs et al. | |
| 2001/0026377 A1 | 10/2001 | Ikegami | |
| 2001/0034659 A1 * | 10/2001 | Kobayashi | 705/26 |
| 2001/0034717 A1 * | 10/2001 | Whitworth | 705/64 |
| 2001/0037455 A1 * | 11/2001 | Lawandy et al. | 713/176 |
| 2001/0043362 A1 | 11/2001 | Hull et al. | |
| 2001/0044324 A1 * | 11/2001 | Carayiannis et al. | 455/564 |
| 2001/0044824 A1 * | 11/2001 | Hunter et al. | 709/203 |
| 2001/0046307 A1 | 11/2001 | Wong | |
| 2001/0051915 A1 | 12/2001 | Ueno et al. | |
| 2001/0051964 A1 | 12/2001 | Warmus et al. | |
| 2001/0054067 A1 * | 12/2001 | Miller et al. | 709/203 |
| 2002/0006212 A1 * | 1/2002 | Rhoads et al. | 382/100 |
| 2002/0018879 A1 | 2/2002 | Barnhart et al. | |
| 2002/0023027 A1 | 2/2002 | Simonds | |
| 2002/0023148 A1 | 2/2002 | Ritz et al. | |
| 2002/0048369 A1 | 4/2002 | Ginter et al. | |
| 2002/0054356 A1 | 5/2002 | Kurita et al. | |
| 2002/0070278 A1 * | 6/2002 | Hung et al. | 235/472.01 |
| 2002/0075298 A1 | 6/2002 | Schena et al. | |
| 2002/0078357 A1 | 6/2002 | Bruekers | |
| 2002/0080271 A1 | 6/2002 | Eveleens et al. | |
| 2002/0080396 A1 | 6/2002 | Silverbrook et al. | |
| 2002/0085238 A1 | 7/2002 | Umeda | |
| 2002/0085759 A1 | 7/2002 | Davies et al. | |
| 2002/0097420 A1 | 7/2002 | Takaragi et al. | |
| 2002/0106102 A1 | 8/2002 | Au et al. | |
| 2002/0112171 A1 | 8/2002 | Ginter et al. | |
| 2002/0118394 A1 | 8/2002 | McKinley et al. | |
| 2002/0153661 A1 | 10/2002 | Brooks et al. | |
| 2002/0195495 A1 | 12/2002 | Melick et al. | |
| 2003/0012548 A1 | 1/2003 | Levy et al. | |
| 2003/0014315 A1 | 1/2003 | Jaalinoja et al. | |
| 2003/0032033 A1 | 2/2003 | Anglin et al. | |
| 2003/0066883 A1 | 4/2003 | Yu | |
| 2003/0164400 A1 | 9/2003 | Boyd | |
| 2005/0056700 A1 | 3/2005 | McKinley et al. | |

(56) References Cited

U.S. PATENT DOCUMENTS

| | | |
|---|---|---|
| 2005/0085188 A1 | 4/2005 | Ishii et al. |
| 2005/0111723 A1* | 5/2005 | Hannigan et al. ............. 382/135 |
| 2007/0177761 A1 | 8/2007 | Levy |
| 2007/0183623 A1 | 8/2007 | McKinley |
| 2008/0052783 A1 | 2/2008 | Levy |
| 2009/0158318 A1 | 6/2009 | Levy |
| 2009/0180697 A1 | 7/2009 | Erol et al. |

OTHER PUBLICATIONS

Whittaker, et al., "Back to the Future: Pen and Paper Technology Supports Complex Group Coordination," CHI '95, Conference on Human Factors in Computing Systems, Denver, Colorado (May 7-11, 1995) (text copy obtained from ACM).

Prosecution excerpts from U.S. Appl. No. 10/973,934 of Hannigan, et al (Feb. 2, 2011 Non-Final Rejection and Apr. 29, 2011 Amendment).

\* cited by examiner

WATERMARK SYSTEMS AND METHODS

RELATED APPLICATION DATA

This application is a Continuation of U.S. application Ser. No. 10/029,229, filed Dec. 21, 2001 which claims priority to provisional application 60/257,822, filed Dec. 21, 2000.

FIELD OF THE INVENTION

The present disclosure memorializes various improvements relating to digital watermarking technology and applications.

BACKGROUND OF THE INVENTION

The present disclosure memorializes various improvements relating to digital watermarking.

Digital watermarking is the science of encoding physical and electronic objects with plural-bit digital data, in such a manner that the data is essentially hidden from human perception, yet can be recovered by computer analysis. In physical objects, the data may be encoded in the form of surface texturing, or printing. Such marking can be detected from optical scan data, e.g., from a scanner or web cam. In electronic objects (e.g., digital audio or imagery—including video), the data may be encoded as slight variations in sample values. Or, if the object is represented in a so-called orthogonal domain (also termed "non-perceptual," e.g., MPEG, DCT, wavelet, etc.), the data may be encoded as slight variations in quantization values or levels. The present assignee's U.S. Pat. No. 6,122,403, and application Ser. No. 09/503,881 (now U.S. Pat. No. 6,614,914), are illustrative of certain watermarking technologies.

Watermarking can be used to tag objects with a persistent digital identifier, and as such finds myriad uses. Some are in the realm of device control—e.g., tagging video data with a do-not-copy flag that is respected by compliant video recorders. (The music industry's Secure Digital Music Initiative (SDMI), and the motion picture industry's Copy Protection Technical Working Group (CPTWG), are working to establish standards relating to watermark usage for device control.) Other watermark applications are in the field of copyright communication, e.g., indicating that an audio track is the property of a particular copyright holder.

Other watermark applications encode data that serves to associate an object with a store of related data. For example, an image watermark may contain an index value that serves to identify a database record specifying (a) the owner's name; (b) contact information; (c) license terms and conditions, (d) copyright date, (e) whether adult content is depicted, etc., etc. (The present assignee's MarcCentre service provides such functionality.) Related are so-called "connected content" applications, in which a watermark in one content object (e.g., a printed magazine article) serves to link to a related content object (e.g., a web page devoted to the same topic). The watermark can literally encode an electronic address of the related content object, but more typically encodes an index value that identifies a database record containing that address information. Application Ser. No. 09/571,422 (now U.S. Pat. No. 6,947,571) details a number of connected-content applications and techniques.

One problem that arises in many watermarking applications is that of object corruption. If the object is reproduced, or distorted, in some manner such that the content presented for watermark decoding is not identical to the object as originally watermarked, then the decoding process may be unable to recognize and decode the watermark. To deal with such problems, the watermark can convey a reference signal. The reference signal is of such a character as to permit its detection even in the presence of relatively severe distortion. Once found, the attributes of the distorted reference signal can be used to quantify the content's distortion. Watermark decoding can then proceed—informed by information about the particular distortion present.

The assignee's applications Ser. No. 09/503,881 (now U.S. Pat. No. 6,614,914) and Ser. No. 09/452,023 (now U.S. Pat. No. 6,408,082) detail certain reference signals, and processing methods, that permit such watermark decoding even in the presence of distortion. In some image watermarking embodiments, the reference signal comprises a constellation of quasi-impulse functions in the Fourier magnitude domain, each with pseudorandom phase. To detect and quantify the distortion, the watermark decoder converts the watermarked image to the Fourier magnitude domain and then performs a log polar resampling of the Fourier magnitude image. A generalized matched filter correlates the known orientation signal with the re-sampled watermarked signal to find the rotation and scale parameters providing the highest correlation. The watermark decoder performs additional correlation operations between the phase information of the known orientation signal and the watermarked signal to determine translation parameters, which identify the origin of the watermark message signal. Having determined the rotation, scale and translation of the watermark signal, the reader then adjusts the image data to compensate for this distortion, and extracts the watermark message signal as described above.

With the foregoing by way of background, the specification next turns to the various improvements. It will be recognized that these improvements can typically be employed in many applications, and in various combinations with the subject matter of the patent documents cited herein.

DETAILED DESCRIPTION

Watermarks and Article Authentication

Some applications can employ watermark technology both for connected content/linking purposes, and for security/authenticity checking as well. Consider collectable sports paraphernalia as one example. (The same principles are naturally applicable on a much broader basis.)

It has been proposed that such paraphernalia be watermarked to assign each item a unique number (e.g., of a limited edition). Such marking can be effected by texturing (e.g., by engraving, etc.), printing (e.g., by silk-screen or otherwise, etc.). To assure that such marking isn't copied onto counterfeit articles, it desirably uses a watermark that does not survive copying (so-called "frail" watermarking). Examples of such frail watermarking are shown in copending applications Ser. No. 09/498,223 (now U.S. Pat. No. 6,574,350), Ser. No. 09/645,779 (now U.S. Pat. No. 6,714,683), Ser. Nos. 60/232,163, 09/689,289, 09/689,293 (now U.S. Pat. No. 6,683,966), Ser. No. 09/689,226 (now U.S. Pat. No. 6,694,041), and Ser. No. 60/247,389. (Use of frail watermarks on trading cards is disclosed in application Ser. No. 09/630,243 (now U.S. Pat. No. 6,735,324).)

The process may work as follows:

1. Company X embeds 500 baseballs with 500 unique watermarks/id's.
2. The baseballs are distributed to retail outlets and sold.
3. The baseballs are packaged with material explaining what the watermark is and how it works.

4. The buyer opens the package and holds the baseball up to a web cam.

5. The default site for this is the "Register Your Mike McGwire Baseball" (or whatever) page.

6. After the buyer registers the baseball they are sent to a new page that is the provenance page for the baseball.

7. Since all watermarks/baseballs are unique, each time going forward the buyer holds up the ball he/she goes to the page that says "Yep this one is real."

8. Company X changes the destination page to which that baseball thereafter links (e.g., by changing the entry in a redirection database).

UV Watermarks

Certain printing contexts pose special challenges for digital watermarking. A case in point is certain product packaging, which may use a spot color fill over the entire package and may be inked by only one plate in the printing process. In this case, the variations in the printing needed to convey the watermark might be effected only by small areas that are devoid of ink. This is unsatisfactory in various applications.

To redress this, the watermarking can be effected using UV ink. Some of the UV spectrum is detected by the CCD or CMOS detector of most cameras under normal lighting. The effect can be enhanced by illuminating the object with black light in order to fluoresce the mark at the time of imaging—making the mark visible to the user and the camera.

Such an arrangement is well suited for in-store kiosks where a black light can be positioned with the camera. The kiosk may be arranged to that the user never sees the black light-illuminated UV watermark since it will be facing away from them as they present the watermark to the camera.

There are two different types of UV inks.

The first, and more generally applicable, type of UV ink is a conventional printing ink—used like other inks. Such inks typically fluoresce blue, orange, yellow and green. Various usages are possible. One is to print just the UV ink, with no normal ink below it, so the media appears unprinted. Another is to overprint other ink (e.g., conventional package markings) with the UV ink. Yet another is to print the UV ink over an un-watermarked flood of black or other ink. Still another is to print one watermark using conventional ink, and overprint on it a second watermark pattern using UV ink. The second watermark pattern can be the same as the first pattern, or different (e.g., conveying the same watermark payload, or a different one).

The second type of UV ink is a lacquer that is commonly used for protecting images—typically outdoors like billboards, corrugated containers and other signage—from sun damage. This coating is put on after the object is printed, e.g., as a totally separate process, and then cures for some amount of time. Such lacquers are fairly viscous, forming relatively thick coatings. The thickness of the coating can be locally varied to change the surface topology of the object and thereby encode a watermark. For example, the lacquer can be uniformly applied in a first coat. Then a second, patterned, coat can be applied, depositing lacquer in some regions, and depositing none in others. With even a difference of a few microns, sufficient optical (and UV) distinctions can be detected between the regions to permit decoding of a watermark. (While the arrangement just described yields a binary watermark—with pels either "on" or "off" —similar techniques can be employed to effect a gray-scale-like encoding, e.g., by depositing lacquer in a range of intermediate thicknesses in different regions, or through use of a digital press.

Earlier disclosure relating to use of UV inks is provided in copending application Ser. No. 09/562,516 (now abandoned, but the disclosure of which is included in allowed application Ser. No. 09/811,366, filed Mar. 15, 2001, now U.S. Pat. No. 6,985,600). U.S. Pat. No. 5,850,481 includes claims directed to texturing the microtopology of a surface to convey a watermark.

Watermarking by Article Shaping

The example just-given focused on UV inks and coatings as means to convey watermarks. The latter-discussed concept of applying different layers of material to encode a watermark, however, is applicable with materials other than UV inks. Any material that can be selectively deposited or printed to yield a controllable surface texture can similarly be applied. The scale of the surface texture, and component pel size, is application dependent. (Pel here refers to a pixel-like component that may be utilized in certain watermarks, e.g., in forming rectangular patterns that can be tiled over a surface. Such arrangements are further detailed, e.g., in U.S. Pat. No. 5,862,260 and other references cited above.)

Moreover, the local variations can be effected by selectively removing or indenting a material, rather than simply adding a supplemental material.

To apply materials, various known ink printing technologies can be employed. On a smaller scale, techniques such as chemical vapor deposition can be utilized. To selectively remove or indent materials, techniques such as etching (chemical or plasma) and engraving can be used. Photolithography on photosensitive media, with subsequent development and removal of exposed (or unexposed) areas are other options.

The use of high-pressure intaglio techniques to texture paper is disclosed in laid-open application WO 200045344 and in pending application Ser. No. 09/127,502 (now U.S. Pat. No. 6,345,104).

Blank Substrate Watermarking

In various of the assignee's prior applications, the notion of tinting blank paper substrate with a watermark was disclosed (e.g., application Ser. Nos. 09/127,502 (now U.S. Pat. No. 6,345,104) and Ser. No. 09/631,409 (now abandoned in favor of continuation application Ser. No. 11/244,907, filed Oct. 5, 2005).) Many printers, however, cannot print to the margin of paper due to interference by pinch-rollers, or other paper-handling mechanisms. If a paper is tinted with a watermark, but the watermark does not extend to the edge of the page, the invisibility of the watermark is compromised by the contrast with the bordering, un-marked part of the page.

One approach is simply to exploit this visual feature—publicizing that it signifies that the page is watermarked.

A curative approach is to taper-off the watermark intensity towards the edges of the page, so a smooth transition between marked and unmarked regions may be effected. This will compromise readability near the edge of the page, but that is an acceptable trade-off in most applications.

Another approach is to pre-mark the blank paper at the margins, e.g., by the paper producer. The margin can be printed with a watermark that conveys just the reference (orientation/grid) signal.

Yet another approach is to pre-mark the entire page, e.g., by the paper manufacturer or distributor (e.g., Xerox or HP). All pages in a package (e.g., of 100 sheets) may be marked identically. An informational page can be automatically generated for that package by a variable data printer. In addition to including the unique code associated with that pack, the informational page also tells the consumer how to register the URL for those unique watermarks, e.g., by visiting the web site at the worldwide web address registerwatermark.com. This informational page is inserted into each pack, and the package is distributed through the normal retail channels. (In-store kiosks may be used to facilitate user registration of purchased paper packs.) When the user purchases the pack, he or she visits the mymarc.com site and specifies the URL to which that uniquely-marked paper should link.

Of course, it is not just letterhead or the like that can be premarked. Any printing stock can be processed to pre-encode a watermark, including greeting card stock, business card stock, direct mail inserts, etc.

Watermarks and Wristwatches, etc

In application Ser. Nos. 09/670,114 (now abandoned) and Ser. No. 09/151,492 (now abandoned in favor of continuation application Ser. No. 10/693,269, filed Oct. 23, 2003, now U.S. Pat. No. 6,882,738), the present assignee detailed how watermarks can be employed on everyday objects, such as wristwatches, and serve to enable additional features.

The detailed embodiments noted that a watermark pattern can be engraved into an exterior surface of such an item. But other arrangements are possible. Consider digital watches, or other devices with electronic displays. A watermark pattern can be formed by the display itself, by controlling individual pixels accordingly. Different patterns can be made to appear on the screen in order to provide different functionality.

Taking the case of a digital wristwatch, it is familiar that many different features and modes can be set by manipulation of a few simply user interface controls—such as buttons. In accordance with this aspect of the invention, one mode can set the watch to display a first watermark pattern. The user can present the wristwatch display to a webcam, which senses the displayed pattern, decodes the watermark therefrom, and triggers a corresponding action. The action corresponding to the first watermark pattern can be to link an associated internet device to a personalized web site relating to the user's fitness training (e.g., as further detailed in the '114 application).

Similarly, by further manipulation of the device's user interface, a second watermark pattern can be made to appear on the watch display. When this pattern is sensed by a webcam, a different response can be triggered (e.g., access to a web-based email account associated with the user).

While the responses just-detailed are tailored to the particular user, other patterns can trigger responses that are the same for a class of users, or for all users. Examples include linking to CNN headlines, weather information, etc., etc.

To trigger custom responses, custom watermark payloads—unique to that user—can be employed. This can be achieved by device serialization, e.g., assigning each wristwatch a different ID number, and deriving unique watermark payloads from such ID. (Suitable measures must be taken to assure that user privacy is respected.)

Another way of triggering user-customized responses does not rely on serialization of the wristwatch. Instead, the responding- or linking-system (e.g., a PC, camera-equipped cell phone, etc.) can include data specific to the user. Thus, all wristwatches may display the same watermark pattern when put in the "link-to-personal-training-website" mode. John's computer can respond to this payload by linking to www.address.com/john_fitness, whereas Jane's computer can respond to this same payload by linking to www.address.com/jane_fitness.html—based on customization data resident in the associated device.

In still other arrangements, the wristwatch (or PDA) screen can show an image such as a picture of the PDA's owner. The picture can be watermarked to serve as a business card. This picture can be beamed to an associate's device (e.g., PDA) at conferences, for example. When the associate gets back to an online computer he can hold up the picture (or digitally submit to a watermark reader) and link directly to the first person's contact page or similar destination for sales, etc.

This can also be used as a viral promotions opportunity where people start beaming the watermarked image to anybody else that has a PDA. Picture a crowd of friends or colleagues at MacWorld. The new recipients hold their PDA up to a webcam at a kiosk or at the office. A pollination or diaspora effect ensues. Take this one step further and, when a user beams the watermarked picture to another device, he also beams a small application with it that modifies the watermark each time it's beamed. The modification could change the payload so that there may be, e.g., 10,000 different payloads. Each time it's beamed, the watermark changes within the parameters of this 10,000 unit payload. One of these payloads is a winner once you check it online in the promotion. The idea is to generate traffic across many PDAs and get them all to check if their mark is the winner.

One advantage to such arrangements is that the wristwatch housing does not need to be custom fabricated. Another is that the watermark can be controlled to present a number of different payloads, rather than a single, unchanging, payload.

Watermarks and Transaction Cards

In application Ser. No. 09/562,049, the assignee disclosed how a consumer's physical custody of a credit card can be verified—when making on-line purchases—by showing the credit card to a camera-equipped system that reads a verification watermark from the card face.

To deter use of precision photocopy apparatuses to reproduce credit card faces (with associated watermark), the face of the card can be provided a reflective layer, e.g., in the form of an overlay or varnish. In the bright illumination of a photocopier, such layer mirrors the light back onto the photodetectors, preventing them from accurately reproducing the watermark pattern. In contrast, when presented to a web cam or other such imaging device, no bright illumination is typically present, so the photosensors are not overwhelmed and the card can be used for its intended authentication purpose.

If a home PC web cam, or other imaging device, is used to capture an image of the card—to confirm its physical presentment—the same imaging device can be used to acquire an image of the user (only with user permission . . . ) This image can be transmitted to the on-line merchant and stored in association with the transaction record. Automated pattern recognition techniques can be used to confirm that the image captured and logged in the merchant's computer is, in fact, a face. If it later turns out that the card was stolen, on-line merchants with which it was used may have an image of the perpetrator.

It may be desirable to incent authenticated on-line credit card transactions by providing a reward to consumers who participate in the desired manner. Thus, for example, a consumer that demonstrates physical custody of a credit card by presenting same to a camera (and having the watermark decoded, etc.), may receive a 0.5% discount. If the consumer further consents to capture and storage of a facial image, the consumer may receive a 1% discount, etc.

Alternatively, the incentive may be offered to the merchant, by the charge card company.

In a variant arrangement, the watermark reader can read the watermark and also capture image data unique to the card/camera combination. The data is submitted to an authentication server and thus becomes a "signature" for that transaction. Any form of attack that attempts to replay the transaction at a later time will fail because of duplicate signature. Because the actual card image is not used, it cannot be captured as a form of attack. Furthermore, a scanned image of a card used to circumvent the system would have an unvaried signature and would thus trigger detection of the attack if used multiple times.

Watermarks and Software Licensing

A premise of the '049 application—remotely confirming possession of an object by use of watermark information decoded from the object—finds application beyond internet credit card usage.

One such other application is in software licensing. If a corporate enterprise buys a license entitling it to install a software program on 100 computers, it typically receives a single copy of the disk, and then installs the software on (hopefully) 100 computers or less.

The disk can be distributed with a watermarked card, or other talisman. (Or the disk itself can be watermarked.) Each time the software is installed on a computer, the card (or talisman, or disk) must be shown to an associated web cam. The computer decodes the watermark, transmits it to the software vendor, which then increments a tally detailing the number of installations made so far. If the number doesn't exceed the licensed number, the software vendor transmits-back a key or other data that permits the program to be utilized.

If the card is not shown to the camera, or if the card is shown 101 times, the software is inoperative.

Watermarks and Magnetic Recording Media

Magnetic recording media are well suited to steganography, such as digital watermarking.

While prior art teaches that minute variations (e.g., noise) inherent in a magnetic medium (e.g., a credit card stripe) can be used to uniquely identify the medium, it does not appear such slight variations have been effected deliberately to convey auxiliary, (convert) data.

The same functionality gained by watermarking of digital and physical objects (e.g., object identification, authentication, linking, etc.) can likewise be achieved by watermarking of magnetic media.

Watermarks Miscellania

The applications of watermarking extend far beyond those noted above. One is steganographic marking of circuit boards, e.g., to encode manufacturing information (fab date, mask identifiers, process parameters, alignment data) and security or authentication information. Alignment grid data, for example, can be printed on the board to facilitate navigation relative to the board, e.g., by automated parts placement devices and soldering apparatus. The grid can permit local estimates of board rotation and standoff distance from the optical sensor. Among the advantages from such approach are lower cost solder paste inspection systems; measurement reference plane can be determined from grid rather than performing height reconstructions over the entire board; faster and more accurate navigation of sensor or pick-and-place nozzle over board, and eliminating need for fiducial marks which waste previous board space.

Another application is watermarking of electronic components, such as integrated circuits, capacitors, resistors, etc. This would allow machine recognition of such parts, facilitating use in automated board stuffing equipment. The watermark may also convey information required for test or inspection, such as which algorithms to run, and what the applicable tolerances are.

In the foregoing arrangements, a camera may be integrated with the robotic arm or nozzle that places components on the board, or solders same. This offers improvements in speed and accuracy when compared with fixed camera systems.

Another is marking of public signage, e.g., street signs, with steganographic marking that can be sensed by automotive sensors and used, e.g., for navigation purposes.

While watermarking of physical objects is known from the assignee's prior applications, the objects can be those associated with rendering of electronic content. Thus, for example, computer screens (CRT and LCD) and projection system optical components can be formed to encode a static watermark on all content rendered on such device.

Counterfeiting of designer garments is big business. Such piracy can be deterred by watermarks. For example, a garment's hang-tag or ribbon-tag can be watermarked (e.g., by tinting, text steganography, etc.), and cross-checked against data memorialized elsewhere on the garment (e.g., a barcode on another tag, or a watermark formed by subtle changes to coloration or imagery on the garment). If these two data do not correspond in an expected manner, the garment may be presumed to be a knock-off.

In some applications, a watermark can be initially concealed, and revealed after usage. The soles of shoes, the tread of tires, any other media that wears-away can cover a watermark pattern, and reveal same only after a period of usage.

Watermarks and Action Triggering

Application Ser. No. 09/709,255 discloses use of watermark technology in connection with toys and dolls that provide "read-aloud" book functionality.

More generally, any mechanical device with a processor and some form of stored memory capable of holding a software program (that can make the machine behave in different manners) can respond to watermarks. The machine discussed can vary greatly in form factor, but—in addition to toys and dolls—can include industrial robots, home appliances, consumer electronic devices (e.g., VCR), etc.

In many cases, the ability of a human owner to actually access and trigger programming within the machine is limited by the form factor, the complexity of the interface or the capabilities of the owner/operator. In the first instance, consider a toy robot or doll with no traditional human input interface such as button controls, keyboard or mice. In the second instance, consider a device such as a VCR which has programming controls, but where the actual steps for programming are time consuming or cumbersome for the owner (thus the permanently flashing 12:00:00 on the front display). In the third instance, the owner of a device such as a toy may not be able to execute complex instructions or even read the instructions due to age limitations, etc.

In accordance with this aspect of the invention, such a machine is provided with a booklet of instructions, each page of which is watermarked to serve as a programming "trigger." One page, for example, may have the trigger for setting a robot to dance. By flipping to the page, then holding the page up in front of the robot, the trigger is delivered via an onboard camera and reader. The robot then uses the watermark/trigger to retrieve the instruction set associated with the watermark and alters behavior accordingly. In the case of children's toys, the instructions could be in the form of pictographs. In this case, the child only needs to be instructed in how to select the desired action, then hold the booklet up to trigger the behavior.

Watermarks And Decryption

This aspect of the invention relates to protecting encrypted media, such as DVDs. There is a concern that if digital watermarking is used as a DVD copy control, it may be circumvented by building a DVD player that will decrypt the DVD, but will not detect the copy control digital watermarks—rendering the copy control digital watermarks useless.

In accordance with this aspect of the invention, digital watermarking is tied to the decryption process. In a first implementation, a digital watermark associated with video frame n includes a plural-bit payload. The plural-bit payload includes a decryption key to decrypt a successive video frame n+1 (or n+2, etc.), or to decrypt an upcoming set of video frames. In order to obtain appropriate decryption keys for upcoming frames, a DVD player *must* decode the digital watermarks. Of course, the digital watermarks can be embedded in audio as well as video channels.

In a second implementation, a non-digital watermark detecting DVD player can still decode the video, but only a low fidelity version. A high fidelity version (e.g., surround sound, full color images, etc.) is only accessible from a key carried by a digital watermark payload. The high fidelity version is unlocked (or decrypted) with the digital watermark key.

To provide a comprehensive disclosure without unduly lengthening this specification, the patents and applications cited above are incorporated herein by reference, with the exception of application Ser. No. 09/811,366.

Having described and illustrated the subject technologies with reference to illustrative embodiments, it should be recognized that the invention is not so limited.

For example, while the detailed description focused on digital watermarks to convey auxiliary information with audio and video content, other techniques can be used as well (e.g., VBI, digital fingerprints, header meta data, etc.). Likewise, in embodiments relating to marking of physical objects, other machine-readable data representations can be employed (e.g., bar codes, glyphs, RF IDs, mag stripes, smart card technology, etc.).

The implementation of the functionality described above (including watermark decoding) is straightforward to artisans in the field, and thus not further belabored here. Conventionally, such technology is implemented by suitable software, stored in long term memory (e.g., disk, ROM, etc.), and transferred to temporary memory (e.g., RAM) for execution on an associated CPU. In other implementations, the functionality can be achieved by dedicated hardware, or by a combination of hardware and software. Reprogrammable logic, including FPGAs, can advantageously be employed in certain implementations.

It should be recognized that the particular combinations of elements and features in the above-detailed embodiments are exemplary only; the interchanging and substitution of these teachings with other teachings in this and the incorporated-by-reference patents/applications are also contemplated.

In view of the wide variety of embodiments to which the principles and features discussed above can be applied, it should be apparent that the detailed embodiments are illustrative only and should not be taken as limiting the scope of the invention. Rather, I claim as my invention all such modifications as may come within the scope and spirit of the following claims and equivalents thereof.

We claim:

1. A method comprising:
sensing, by a camera-equipped system, a pattern displayed on a screen of a portable device, wherein the pattern is derived based on an identification number associated with the portable device;
generating output data corresponding to the pattern;
decoding plural-bit information from the output data; and
accessing a network account associated with a user of the portable device based at least in part on the decoded plural-bit information.

2. The method of claim 1, wherein the network account is accessed based at least in part on personalization data stored on the camera-equipped system.

3. The method of claim 1, wherein the pattern is unique to the user.

4. The method of claim 1, further comprising obtaining corresponding information related to the decoded plural-bit information from a data structure, wherein the network account is accessed based at least in part on the corresponding information.

5. The method of claim 4, wherein the network account comprises an e-mail account.

6. The method of claim 1, wherein the pattern comprises an arrangement of pixels on the display of the portable device.

7. The method of claim 1, wherein the camera-equipped system comprises a camera-equipped cell phone.

8. The method of claim 1, wherein the decoding comprises decoding digital watermark information from the pattern.

9. The method of claim 1, wherein the decoding comprises decoding barcode information from the pattern.

10. An apparatus comprising:
an imaging device configured to sense a pattern displayed on a screen of a portable device, wherein the pattern is derived based on an identification number associated with the portable device; and
a processor operatively coupled to the imaging device, wherein the processor is configured to:
generate output data corresponding to the pattern;
decode plural-bit information from the output data; and
access a network account associated with a user of the portable device based at least in part on the decoded plural-bit information.

11. The apparatus of claim 10, wherein the pattern includes information associated with the user.

12. The apparatus of claim 10, wherein the pattern includes a picture of the user.

13. The apparatus of claim 10, wherein the pattern includes information identifying the user.

14. The apparatus of claim 10, wherein the pattern comprises a first pattern of a plurality of distinct patterns.

15. The apparatus of claim 14, wherein the first pattern is selectable through an interface of the portable device.

16. The apparatus of claim 10, wherein the portable device comprises a personal digital assistant (PDA).

17. The apparatus of claim 10, wherein the portable device is configured to be worn on a wrist of the user.

18. An apparatus comprising:
means for sensing a pattern displayed on a screen of a portable device, wherein the pattern is derived based on an identification number associated with the portable device;

means for generating output data corresponding to the pattern;

means for decoding plural-bit information from the output data; and means for accessing a network account associated with a user of the portable device based at least in part on the decoded plural-bit information.

19. The apparatus of claim 18, wherein the pattern includes digital watermark information.

20. The apparatus of claim 18, further comprising means for storing personalization data corresponding to the user, wherein the network account is accessed based at least in part on the personalization data.

21. A non-transitory computer-readable medium having instructions stored thereon, the instructions comprising:

instructions to generate output data corresponding to a pattern, wherein the pattern is displayed on a screen of a portable device, and wherein the pattern is derived based on an identification number associated with the portable device;

instructions to decode plural-bit information from the output data; and instructions to access a network account associated with a user of the portable device based at least in part on the decoded plural-bit information.

22. The non-transitory computer-readable medium of claim 21, wherein the pattern comprises an arrangement of pixels on the display of the portable device.

23. The non-transitory tangible computer-readable medium of claim 21, further comprising instructions to store personalization data corresponding to the user, wherein the network account is accessed based at least in part on the personalization data.

\* \* \* \* \*

UNITED STATES PATENT AND TRADEMARK OFFICE
CERTIFICATE OF CORRECTION

| | | |
|---|---|---|
| PATENT NO. | : 8,750,556 B2 | Page 1 of 1 |
| APPLICATION NO. | : 11/548167 | |
| DATED | : June 10, 2014 | |
| INVENTOR(S) | : McKinley et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1826 days.

Signed and Sealed this
Fourth Day of August, 2015

Michelle K. Lee
*Director of the United States Patent and Trademark Office*